UNITED STATES PATENT OFFICE.

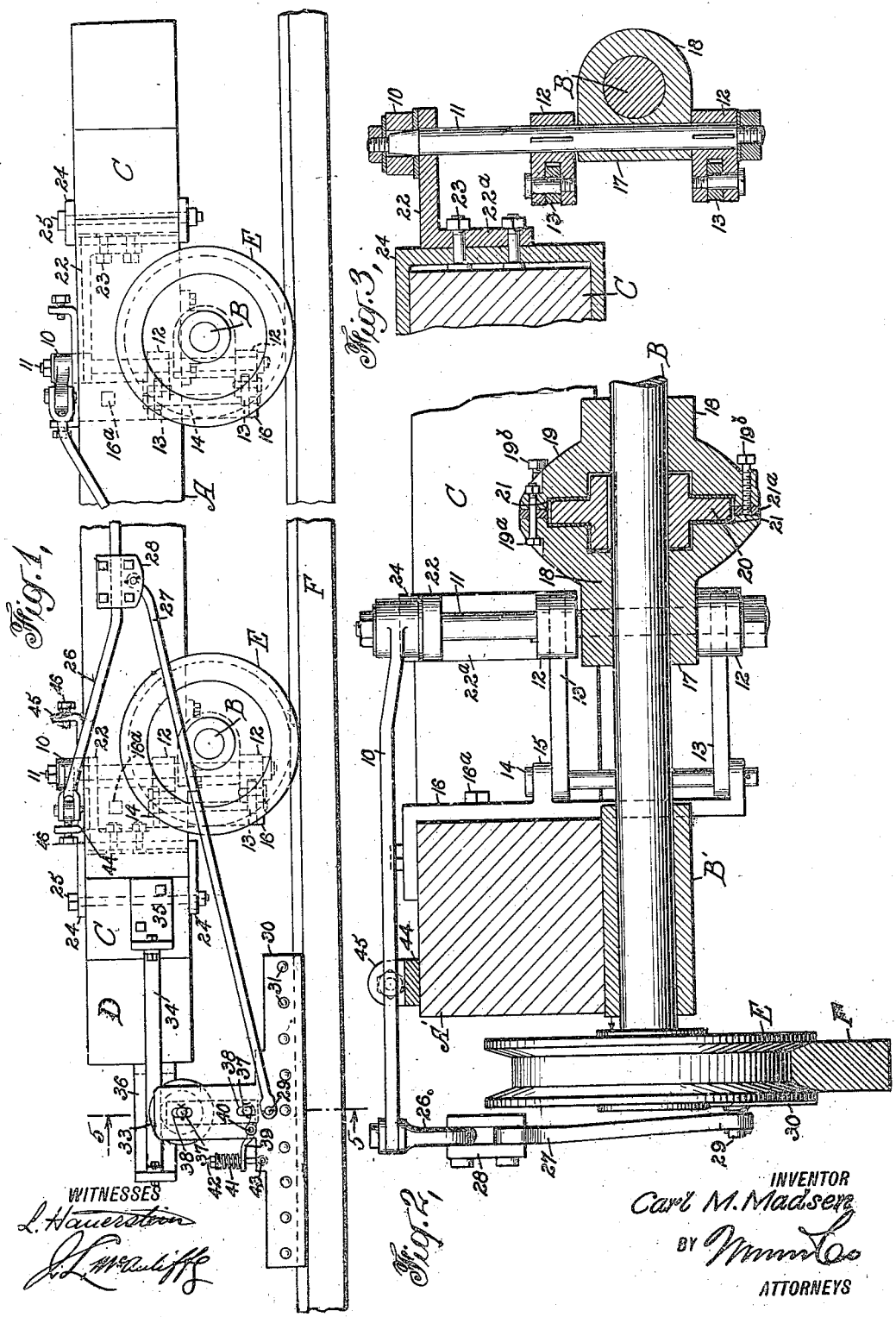

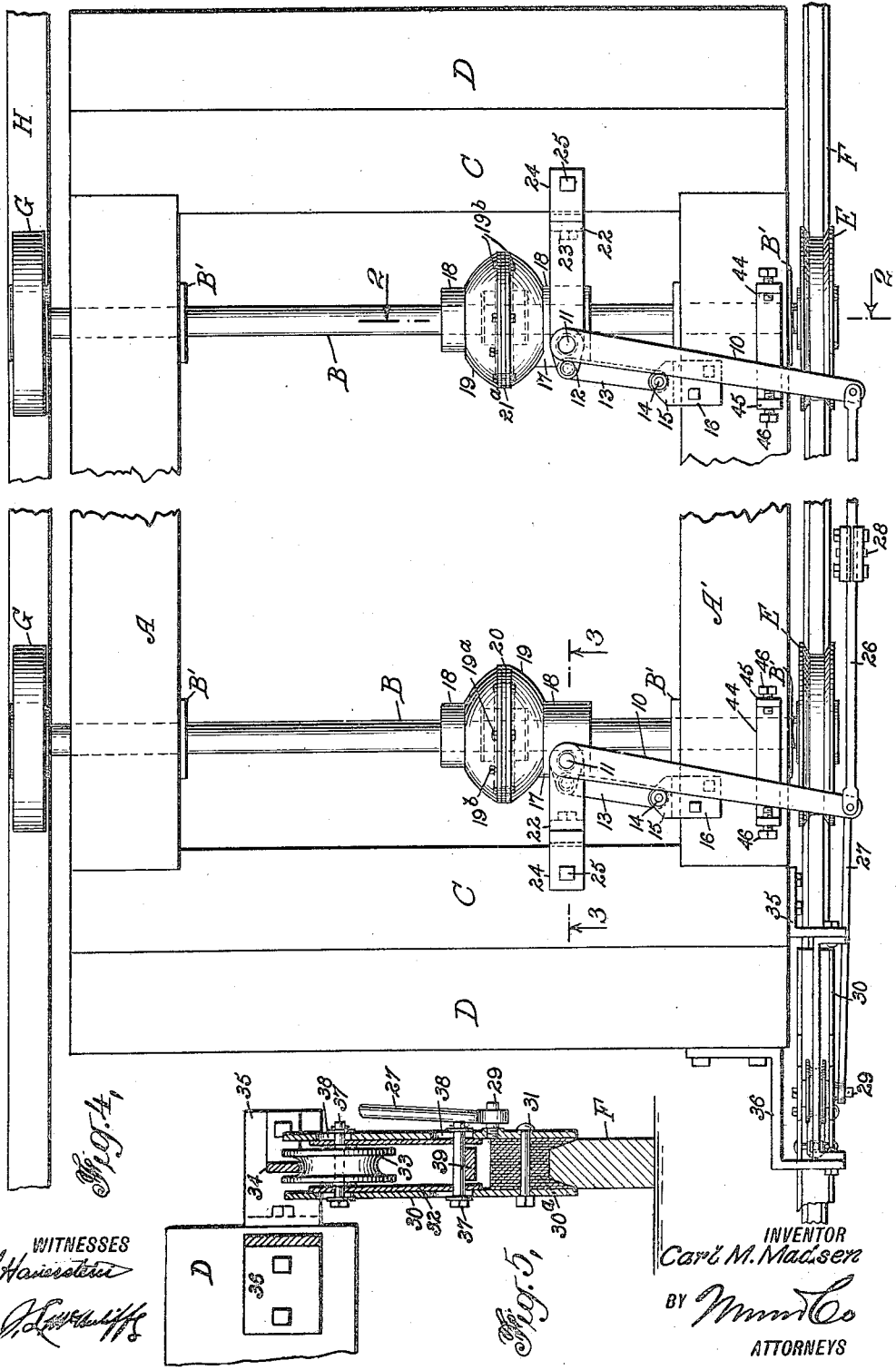

CARL MATHIAS MADSEN, OF SUNBURST, NORTH CAROLINA.

OFFSET FOR SAWMILL-CARRIAGES.

1,252,132. Specification of Letters Patent. Patented Jan. 1, 1918.

Application filed March 27, 1917. Serial No. 157,704.

*To all whom it may concern:*

Be it known that I, CARL M. MADSEN, a citizen of the United States, and a resident of Sunburst, in the county of Haywood and State of North Carolina, have invented a new and Improved Offset for Sawmill-Carriages, of which the following is a full, clear, and exact description.

My invention relates to carriage offsets employed on the carriages of single cutting band saws to cause the offsetting movement as the carriage reverses in order to move the log away from the band saws so that in case a sliver should be on the sawed side of the log, it will not catch on the back of the saw and pull it off the band wheels. The usual offsets employed not infrequently cause considerable trouble in various ways, and parts are liable to wear out quickly, the result being that a positive offsetting is not insured and the service is not always satisfactory.

The prime object of my invention is to provide a positively acting offset constructed and arranged with a view to promote durability of the various parts.

In carrying out my invention use is made of an element, preferably a track shoe, connected with the carriage to travel therewith or to permit of a relative travel of the carriage upon a reverse movement of the latter, and means to temporarily hold the shoe to permit the relative travel of the carriage, this relative travel of the carriage being translated into the offsetting movement.

Figure 1 is a side elevation of parts of a saw carriage having my invention applied thereto;

Fig. 2 is an enlarged fragmentary transverse section on the line 2—2, Fig. 4;

Fig. 3 is an enlarged longitudinal vertical section on the line 3—3, Fig. 4;

Fig. 4 is a plan view of the parts shown in Fig. 1;

Fig. 5 is a transverse vertical section on the line 5—5, Fig. 1.

In carrying out my invention in the illustrated form, which it is to be understood is given as an example, the carriage may be in the main of ordinary form. The letters A, A' represent side members of the carriage frame; B, the axles; C, D, the transverse end frame members; E, grooved wheels on the axle at one side running on an approximately V-shaped rail F; and G, the wheels at the opposite side which are shown flat to run on a flat rail H.

My attachment includes horizontally disposed levers 10 which are swung through an angle forward or back as the carriage reverses upon completing its travel in either direction. To cause levers 10 to offset the carriage frame, they are mounted on vertical shafts 11 having lateral rocker arms 12 to one end of which links 13 are secured, the opposite ends of the links being connected with the adjacent side member A' of the frame in any suitable manner, as for example by bolts 14 extending through said links and through ears 15 on brackets 16 which are bolted as at $16^a$, or otherwise suitably fastened to said frame member A'.

Each shaft 11 turns in a bearing 17 on one of two collars 18 of a housing 19, the housing being in two sections and inclosing a wheel or disk 20 keyed to the axle B. The sections of the housing are secured to each other by bolts $19^a$, said housing sections having a leather packing ring $21^a$ therebetween to make a grease-tight joint, the housing also having brass rings 21 between said disk and the housing. To prevent the bolts $19^a$ from binding the sections on the disk 20, set screws $19^b$ may be employed.

To steady each shaft 11 at its upper end, the latter has a bearing in an arm 22, the flange $22^a$ of which is secured by bolts 23 or otherwise to a bracket 24, said bracket being secured by vertical bolts 25 to the end frame member or girts C. The bolts 25 are not drawn tight to permit looseness and swinging of the brackets 24 as the arms turn through a short angle about the shafts 11 in response to the transverse or offsetting movement of the carriage frame.

Referring to Fig. 4, the arrangement is such that upon a rocking of the shafts 11 by the levers 10, the arms 12 thereon will cause the links 13 to exert a lateral thrust on the frame member A' to effect the offsetting operation, whereby the frame will move laterally relatively to the axles, the axles being permitted an axial sliding movement in the bearings B'. It will be observed from the bottom of Fig. 4 that there is a clearance between the outer ends of the bearings B' and the hubs of the wheels E to permit the lateral movement of the carriage frame. In the offsetting movement of the carriage frame, the approximately V-shaped rail F and the correspondingly grooved wheels E will hold the axles and wheels against axial movement.

The levers 10 are connected by a connecting rod 26 to cause the levers to move in unison. Said rod is depressed or given a drop as best seen in Fig. 1 to clear the back end of the bed blocks and set works (not shown).

In order to actuate the levers 10, a rod or pitman 27 is pivotally secured by a clamp 28 to the rod 26, and the opposite end of said rod 27 is pivotally connected at 29 with a shoe 30 adapted to travel on the track rail F. A paper friction block 30$^a$ is secured between the sides of the shoe 30 to be held by the bolts 31, the friction block being grooved to correspond with the cross section of the rail F. Vertically movable in the shoe is a shell 32 carrying a wheel 33 which runs at the under side of a top rail 34 suitably secured to the carriage members as by brackets 35, 36. Transverse bolts 37 extending through the sides of the shell 32 are permitted movement in vertical slots 38 in the sides of the shoe 30. Beneath the lower bolt 37 is one arm of a lever 39 fulcrumed as at 40 on the shoe 30, and the opposite arm of said lever receives the pressure of a spring 41 coiled about a bolt 42 secured at its lower end as at 43 to the shoe. Thus, it will be seen that the spring 41 causes the friction block 30$^a$ and the wheel 33 to frictionally bear respectively against the track rail F and the upper rail 34. The friction thus caused on the shoe is sufficient to hold the shoe against traveling movement except when it is positively actuated by the carriage.

The levers 10 are permitted only a limited movement for which purpose stop brackets 44 are provided on the frame member A', said brackets having upturned ends 45 receiving set screws 46 to vary the movement permitted the levers. The shoe 30 may tilt slightly in either direction to accord with the movements of the carriage frame and with the swinging of the levers 10 without straining the connections 26, 27.

In operation the shoe 30 tends to bind on the rails F and 34 and when the carriage reverses, the shoe in practice follows a reverse movement of the carriage momentarily but soon the effect of the spring 41 holds the shoe to permit a relative movement of the carriage for swinging the levers 10 until the said levers having reached the limit of their movement between the stops 46 whereupon the shoe will travel with the carriage until the latter again reverses.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. The combination with a saw mill carriage, and a carriage frame adapted to be offset, of a shoe adapted to travel on one of the track rails on which the carriage runs, a second rail on the carriage above the shoe, a spring-pressed wheel on the shoe engaging said second rail, a lever on the carriage having limited rocking movement thereon, means to cause an offsetting movement of the carriage frame by a rocking of the lever, and a connection between said lever and the said shoe, the spring pressure exerted on the said wheel serving to cause frictional engagement of the said wheel with the second rail and tending to frictionally bind the shoe on the first rail, to temporarily hold the shoe to rock the lever upon a reverse movement of the carriage.

2. The combination with a saw mill carriage and its offsetting frame, of a lever mounted on the carriage, means to limit the rocking movement of the lever, a vertical rock shaft on which the lever is mounted, a rocker arm on said shaft, a link connected at one end with said rocker arm and connected at its opposite end with the said frame, a steadying bracket through which said shaft extends, said bracket being secured to said frame and capable of a turning movement thereon, and means to rock said lever by a reverse movement of the carriage.

3. In an offset for saw mill carriages involving means adapted to travel with the carriage or to permit relative travel of the carriage to effect the offsetting; a friction shoe adapted to travel on a rail of the carriage track, an upper rail on the carriage, and a spring-pressed wheel mounted on the shoe, to travel on the upper rail, together with means to actuate the offsetting means by the movement of the carriage relatively to the shoe.

4. In an offset for saw mill carriages involving means adapted to travel with the carriage or to permit relative travel of the carriage to effect the offsetting; a friction shoe adapted to travel on a rail of the carriage track, an upper rail on the carriage, a shell on the shoe and movable vertically thereon, a wheel on said shell adapted to travel on the said upper rail, a bolt extending transversely of the shell and through the shoe, a lever engaging said bolt, and a spring exerting pressure on the said lever to yieldingly press the wheel against the upper rail.

CARL MATHIAS MADSEN.

Copies of this patent may be obtained for five cents each, by addressing the "Commissioner of Patents, Washington, D. C."